United States Patent

Luckett et al.

[11] Patent Number: 6,149,853
[45] Date of Patent: Nov. 21, 2000

[54] METHOD FOR MANUFACTURING INTERIOR DOOR PANELS HAVING CONCEALED VOIDS AT THE JUNCTION OF INTEGRALLY MOLDED ENERGY ABSORBERS

[75] Inventors: Thomas Junior Luckett, Saline; Ravi Thyagarajan; Leon Bruce Liu, both of Novi; Dale O. Cramer, Royal Oak; Dave Joseph Bauer, Livonia, all of Mich.

[73] Assignee: Visteon Global Technologies, Inc., Dearborn, Mich.

[21] Appl. No.: 09/128,010

[22] Filed: Aug. 3, 1998

[51] Int. Cl.[7] .................................................. B29C 45/14
[52] U.S. Cl. .................. 264/266; 264/46.4; 264/46.8; 264/328.1; 296/146.7; 425/112; 425/127; 425/129.1
[58] Field of Search .................................. 264/266, 255, 264/328.1, 511, 514, 45.1, 46.4, 46.8; 475/127, 112, 129.1; 296/146.7, 146.6

[56] References Cited

U.S. PATENT DOCUMENTS

| | | |
|---|---|---|
| 3,989,275 | 11/1976 | Finch et al. . |
| 4,306,381 | 12/1981 | Presto . |
| 4,685,722 | 8/1987 | Srock . |
| 4,786,100 | 11/1988 | Kleemann et al. . |
| 4,917,433 | 4/1990 | Tomforde . |
| 4,969,680 | 11/1990 | Shimoda . |
| 5,040,335 | 8/1991 | Grimes . |
| 5,102,163 | 4/1992 | Ishikawa . |
| 5,308,138 | 5/1994 | Hlavaty . |
| 5,413,661 | 5/1995 | Spengler et al. . |
| 5,433,478 | 7/1995 | Naruse . |
| 5,456,957 | 10/1995 | Jackson et al. . |
| 5,536,060 | 7/1996 | Rashid et al. . |
| 5,573,272 | 11/1996 | Teshima . |
| 5,580,122 | 12/1996 | Muehlhausen . |
| 5,593,182 | 1/1997 | Frost . |
| 5,636,866 | 6/1997 | Suzuki et al. . |
| 5,641,195 | 6/1997 | Patel et al. . |
| 5,667,868 | 9/1997 | Freeman . |
| 5,679,301 | 10/1997 | Miklas et al. . |
| 5,709,407 | 1/1998 | Stephens et al. . |
| 5,716,093 | 2/1998 | Sadr . |
| 5,756,189 | 5/1998 | Nagano et al. ......................... 428/198 |
| 5,811,053 | 9/1998 | Ota et al. ................................ 264/511 |
| 6,004,498 | 12/1999 | Fujii et al. .............................. 264/255 |

FOREIGN PATENT DOCUMENTS

| | | |
|---|---|---|
| 0 787 611 A2 | 1/1997 | European Pat. Off. . |
| 0 890 424 A1 | 6/1998 | European Pat. Off. . |

*Primary Examiner*—Mathieu D. Vargot
*Assistant Examiner*—Edmund H. Lee
*Attorney, Agent, or Firm*—Larry I. Shelton

[57] ABSTRACT

An automotive interior door panel having a decorative covering displayed to the interior compartment of a vehicle and a rigid substrate having a backing surface. The backing surface includes a plurality of energy absorbers integrally molded thereon. The method utilizing the following steps. A low-pressure or high pressure injection mold operable between open and closed positions is moved to the open position. The mold has a covering receiving surface and an energy absorber producing surface. A flexible covering is positioned juxtaposed the covering receiving surface. The mold is moved to the closed position to create a space between the covering and the energy absorber producing surface. A molten plastic material is injected into the space to form the door substrate. The substrate has a nominal cross-sectional thickness between said energy absorbers. The energy absorber producing surface includes a plurality of recesses having a width 75% or more of the nominal substrate thickness producing thick-walled energy absorbers on the backing surface. The molten plastic material fuses to the covering to from an integral door panel. The plastic material is allowed to cool and shrink. The plastic shrinkage produces depressions in the substrate called sink marks overlying the intersection between the energy absorber and the substrate wall. The covering bridges the sink marks to conceal the depressions and produce an aesthetically pleasing surface.

8 Claims, 3 Drawing Sheets

METHOD FOR MANUFACTURING INTERIOR DOOR PANELS HAVING CONCEALED VOIDS AT THE JUNCTION OF INTEGRALLY MOLDED ENERGY ABSORBERS

BACKGROUND OF THE INVENTION

1. Field of the Invention

This invention relates to molding an automotive trim component having a rigid substrate, a flexible covering and integrally molded energy absorbers consisting of a plurality of ribs and columns hereinafter known as "energy absorbers". More specifically, the invention relates to an automotive door panel made having integrally molded energy absorbers that produce depressions in the substrate which are concealed by a decorative covering.

2. Description of the Related Art

Modern automotive interiors include components having energy absorbing features. Described in U.S. Pat. No. 5,421,925 is an interior door trim having an energy absorbing foam bolster. The foam is secured to a backing surface of the door panel to absorb energy from a lateral or side direction impact. The U.S. Pat. No. 5,641,195 describes a method of securing the foam bolster to the backing surface of the door. While foam materials are good energy absorbers, the cost and complexity of attaching the bolster to the panel have caused others to utilize molded plastic energy absorbers.

U.S. Pat. No. 5,641,195, teaches a trim component for concealing a structural member. The U.S. Pat. No. 5,641,195 teaches molding the component to have a plurality of energy absorbing ribs spaced relative to one another along a backing surface. The ribs deflect upon contact with the structural member to absorb energy. This construction was particularly well suited for the A, B, C and D pillars of a vehicle. While this construction was particularly well suited for these members, it was difficult to adapt to larger components such as vehicle doors. The ribs generally extend normal to the substrate wall. When the plastic material cools, it shrinks. Because the substrate is thicker in the region over the rib, this area shrinks more. This difference in wall thickness causes depressions commonly called 'sink marks' on the appearance surface. Heretofore, the only way to avoid sink marks was to limit the thickness of the finger to less than 60% of the nominal thickness of the substrate. This was a limiting factor to utilization of energy absorbers on other components.

It has been proposed to include energy absorbing ribs on the backing surface of a vehicle door trim as shown in U.S. Pat. No. 5,433,478. This patent shows a series of ribs having differing heights to provide different rigidity. The patent appears to lack the tables referenced in the specification, but the drawings illustrate that some of the ribs are almost 100% of the nominal substrate wall thickness. This would cause sink marks on the decorative surface of the door. The U.S. Pat. No. 5,433,478 does not address how these sink marks could be reduced or concealed.

U.S. Pat. No. 5,636,866, builds on the disclosure of the U.S. Pat. No. 5,433,478 and is incorporated herein by reference. The U.S. Pat. No. 5,636,866 uses the drawings from the U.S. Pat. No. 5,433,478 to described how thin-walled ribs integrally molded with the door panel do not provide sufficient energy absorbing properties in a confined spaced. The U.S. Pat. No. 5,433,478 also describes the difficulties of producing the long, thin-walled ribs including filing the mold with plastic and ejecting the molded article. The U.S. Pat. No. 5,636,866 overcomes these difficulties by forming a separate box-like structure that is secured to either the door or the trim panel. The energy absorbing structure has thick, short ribs. The ribs provide good energy absorbing properties. Because the structure is molded separately from the door panel, the door does not suffer from the sink marks described. While this structure overcomes the undesirable properties of the U.S. Pat. No. 5,433,478, it does not provide the low-cost easily manufacturable, one-piece panel of the present invention. The U.S. Pat. No. 5,433,478 necessitates a joining process where the energy absorbing structure is attached to the backing surface of the panel or to the structural member of the door inner.

It is desirable to manufacture a door panel having energy absorbing properties in a single operation. It is possible to produce automotive trim components, such as door panels, instrument panels and consoles, using a multi-layered structure comprising a rigid polymeric substrate layer and a decorative flexible covering. Low pressure molding, laminate injection molding or compression injection molding, is currently used in the manufacturing of these components to integrally mold the flexible covering to a surface of the substrate layer. An advantage of the low pressure molding process is that the layers can be molded simultaneously. No pre-forming of either the covering or the substrate is required.

It is possible to adapt the low-pressure molding process to include forming an energy absorber on a door panel. A single operation may fabricate both the door panel with decorative fabric and the energy absorber thus reducing the cost and complexity of the final article. The present invention overcomes the difficulties of the prior art to provide a low-cost, easily manufactured door panel having integral energy absorbing members including a polymeric decorative fabric.

SUMMARY OF THE INVENTION

The present invention overcomes the difficulties of the prior art by providing a method of manufacturing an automotive interior door panel having a decorative covering displayed to the interior compartment of a vehicle and a rigid substrate having a backing surface. The backing surface includes a plurality of energy absorbers integrally molded thereon to manage energy sustained from a severe lateral impact. The method utilizes the following steps: A low-pressure injection mold operable between open and closed positions is moved to the open position. The mold has a receiving surface (cavity) and an energy absorber producing surface (core). A flexible polymeric covering is positioned juxtaposed the covering receiving surface. The mold is moved to the closed position to create a space between the covering and the energy absorber producing surface. A molten plastic material is injected into the space to form the door substrate. The substrate has a nominal cross-sectional thickness between said energy absorbers. The energy absorber producing surface includes a plurality of recesses having a width 75% or more of the nominal substrate thickness producing thick-walled energy absorbers on the backing surface. The molten plastic material fuses to the covering to form an integral door panel. The plastic material is allowed to cool and shrink. The plastic shrinkage produces depressions in the substrate called sink marks overlying the intersection between the energy absorber and the substrate wall. The covering bridges the sink marks to conceal the depressions and produce an aestectically pleasing surface.

The invention may optionally utilize a foam layer between the substrate and covering to provide an expandable filler for the depressions. The foamed-backed covering conceals the sink marks to enable the production of an door panel having integral thick-walled energy absorbers.

The invention produces a low-cost automotive door panel that has good energy absorbing properties. The automotive interior door panel has a decorative covering displayed to the interior compartment of a vehicle and a rigid substrate having a backing surface. The backing surface has a plurality of energy absorbers integrally molded onto said backing surface. The substrate includes a shrinkage depression opposite to the intersection of the energy absorbers and the backing surface. The covering is directly fused to the substrate and spans the depressions, displaying an ascetically pleasing surface.

The invention also includes novel energy absorbing members shaped liked hollow tubes (columns). The tube-shaped energy absorbers include a V-shaped notch portion that enables the energy director to peel when subjected to a force. The peeling action displays a controlled and uniform energy absorbing deformation along the entire length of the column. The notch provides a repeatable opening for the desired peeling deformation.

The invention eliminates the need for adhesives, fasteners or post molding operations needed to secure the energy absorber to the door. The resulting component is more economical to produce and displays an aesthetically pleasing interior surface appearance. These and other benefits of the present invention are more fully described below.

DETAILED DESCRIPTION OF THE PREFERRED EMBODIMENTS

The present invention will be described through a series of drawings, which illustrate the manufacture of an interior door panel. A wide variety of components may be produced using the methods described.

Figure 1:
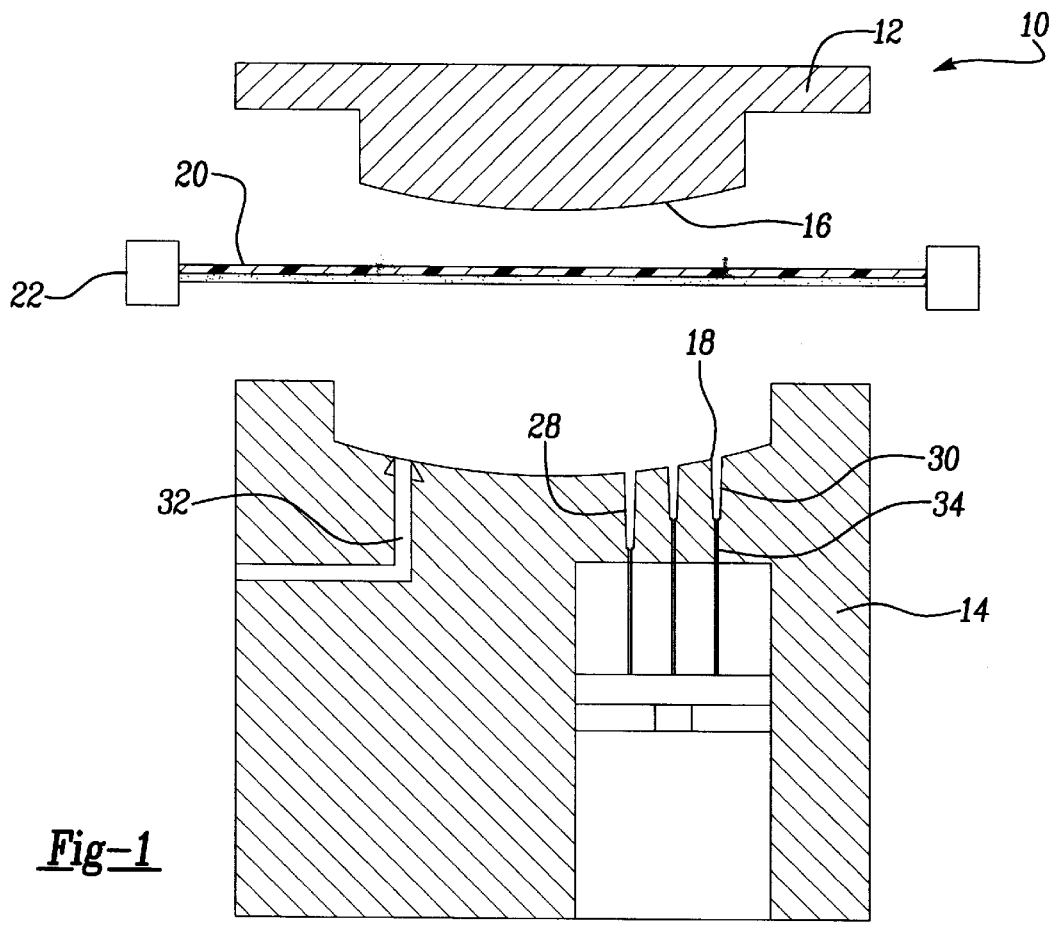
FIG. 1 is a cross-sectional view of an apparatus having opposable molds and movable slides, wherein the molds are open and the ejectors are retracted.

The following items are a word list of the items described in the drawings and are reproduced to aid in understanding the invention:
10 injection molding apparatus
12 movable mold
14 stationary mold
16, 18 shaping surfaces
20 covering
22 frame
24 film layer
26 foam layer
28, 30 recesses
32 resin inlet
34 ejectors
36 cylinder
38 door panel
40, 42 energy absorbers
44 sink mark depression
46 shoulder area
48 hip area
50 V-shaped notch Illustrated in FIG. 1 is an injection molding apparatus 10 that is useful for the present invention. The apparatus 10 includes a movable mold 12 and a stationary mold 14. The molds 12 and 14 have shaping surfaces 16, 18 that impart a shape to the molded article. The mold 12 is raised to an open position and allows a flexible covering 20 to be placed between the surfaces 16, 18. The covering 20 is retained between a frame 22. The covering is made from polymers and has a thickness between 1.0 mm and 3.5 mm. The covering 20 is generally made from a film layer 24 of vinyl or urethane that is grained to provide an aesthetic appearance and a foam layer 26. The foam layer 26 has heretofore been used to provide a soft touch feel and supplemental energy absorbing. As will be more fully described below, the use of a foam layer intermediate the film layer 24 and a rigid plastic substrate aids in concealing the sink mark caused by the energy absorbers.

The apparatus 10 is used to form the covering 20 into a door panel having integrally formed energy absorbers. The shaping surface 18 includes a plurality tapered recesses 28, 30 (only one recess of each type is shown for clarity). The recesses 28 form energy absorbing ribs that project normal to the door panel. The recesses 30 form novel hollow, energy absorbing columns. The recesses 28, 30 are located on the opposite surface of the door panel that is adjacent to the hip and shoulder areas of an occupant. The shaping surface 18 includes resin inlets 32 that inject molten plastic material between the molds 12, 14.

The plastic resin that flows into the recesses 28, 30 forms the energy absorbers. Ejectors 34 push the panel out of the mold 14. Multiple ejectors 34 are used to push the panel out of the mold 14 without damaging the energy absorbers. The multiple ejectors 34 are actuated with a cylinder 36.

Figure 2:
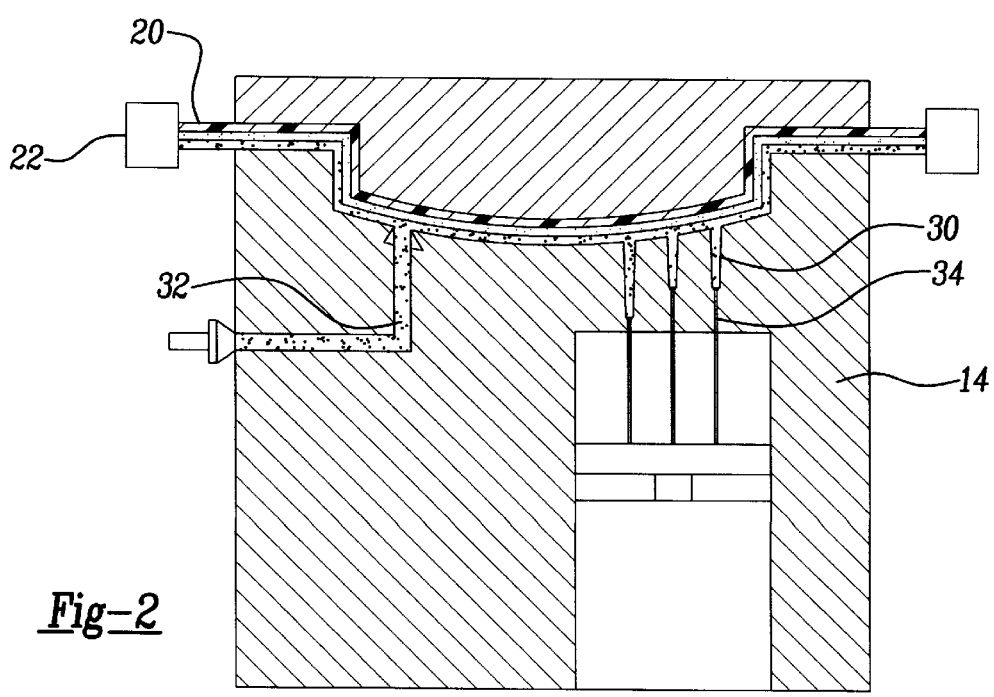
FIG. 2 is a cross-sectional view of the apparatus illustrated in FIG. 1, showing the molds are in a closed position and the molding of a trim component.

The apparatus 10 moves the mold 12 to the closed position as shown in FIG. 2. The covering 20 is optionally drawn against the shaping surface 16 by vacuum. Also optionally, the covering may be pre-shaped to conform to the molds 12, 14. Prior to, or after closing mold 12, a quantity of molten plastic material is injected through the resin inlet 32. The plastic resin contacts and adheres to the covering 20. The plastic material, foam, and covering are made from compatible materials such as the same material that fuse together and bond during the injecting step. The plastic material also flows into the recesses 28, 30 to form the energy absorbers.

Figure 3:
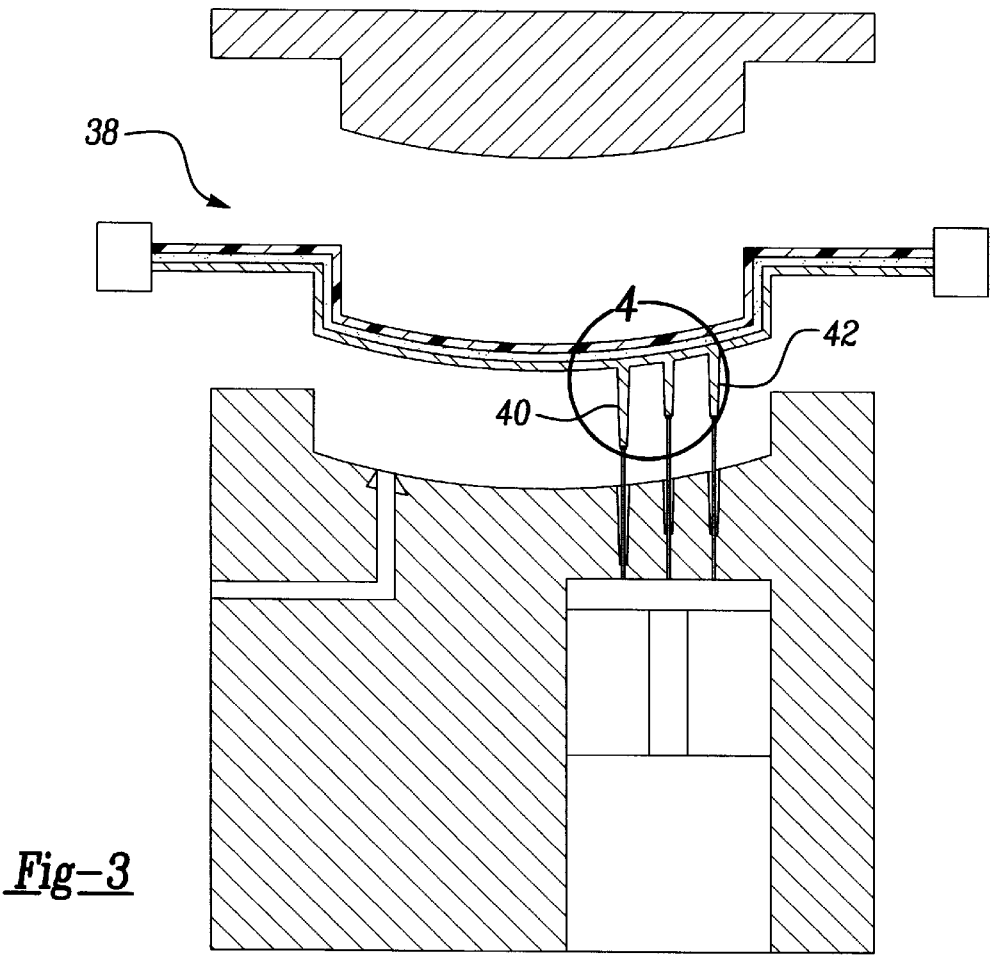
FIG. 3 is a cross-sectional view of the apparatus illustrated in FIG. 1, showing the molds in an open position and the ejectors extended.

The plastic material is allowed to cool and solidify. The plastic material and covering produce a door panel 38 as shown in FIG. 3. The door panel 38 is removed from the mold 14, by raising the cylinder 36 and moving the ejectors 34. The ejectors 34 provide an even pressure along the energy absorbers 40, 42 to remove the energy absorbers from the recesses 28, 30.

Figure 4:
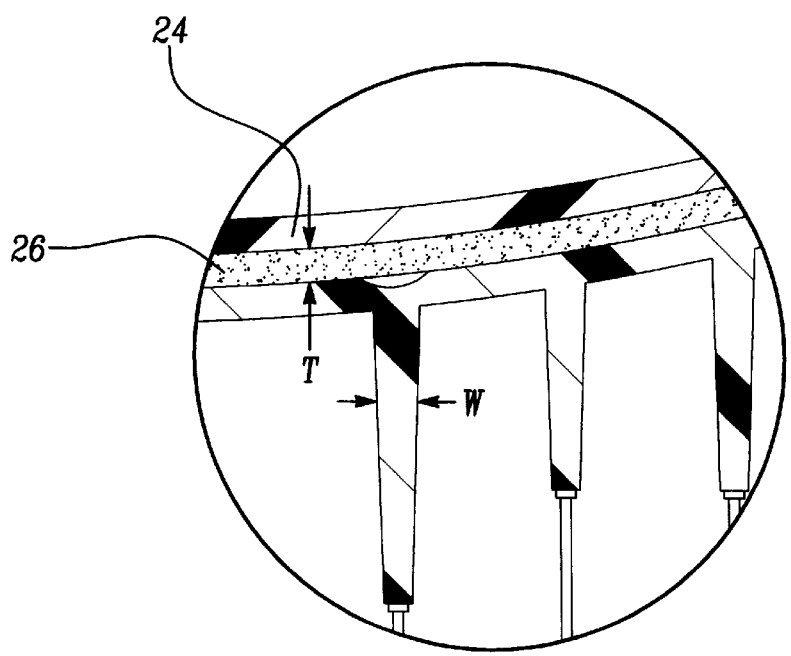
FIG. 4, is a detailed cross-sectional view of the area marked A in FIG. 3.

The invention enables the manufacture of energy absorbing ribs and columns having a width greater than 75% of the panel width. Illustrated in FIG. 4 is a detailed cross-sectional view of the area marked A in FIG. 3. The rib-shaped energy absorber 40 has a width W approximately 60–75% of the panel thickness T. This causes the formation of a sink mark depression 44. The depression 44 is not visible to the passenger compartment because it is concealed by the foam layer 26 and the film layer 24. The foam layer 26 expands slightly to compensate for the part shrinkage in the depression 44. The film layer 24 does not sink or show the depression 44.

Figure 5:
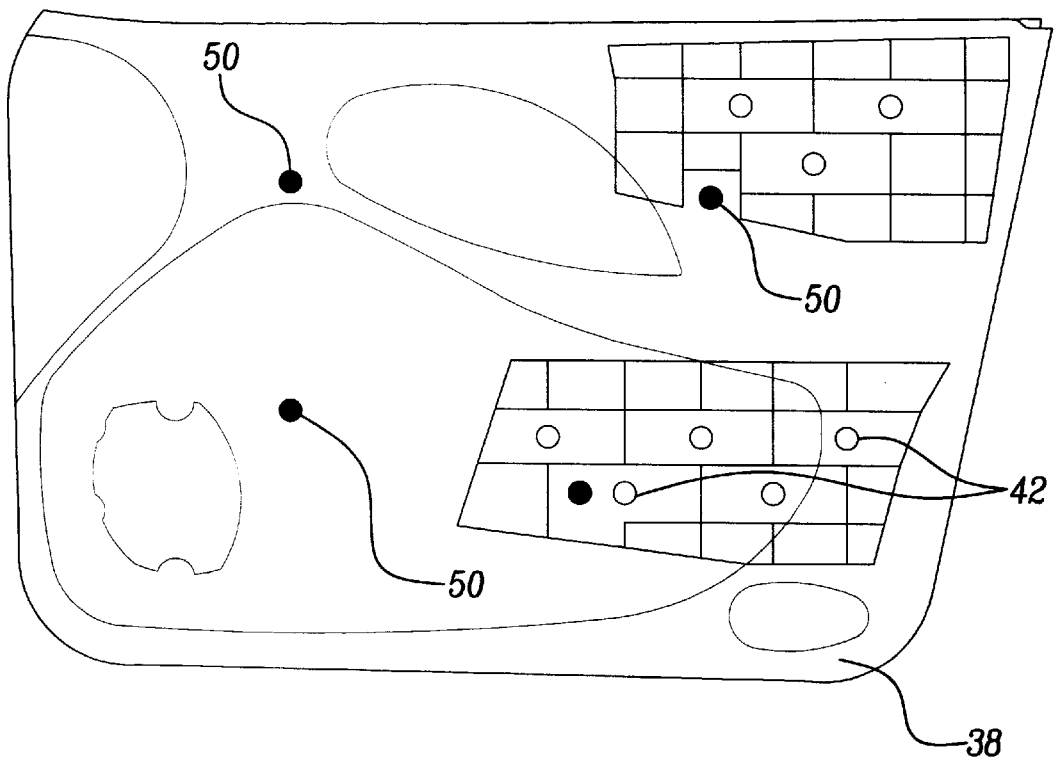
FIG. 5, is a plan view of backing surface of a trim component.

Illustrated in FIG. 5 is a plan view of the reverse surface of the door panel 38. The energy absorbers 40, 42 are arranged along the shoulder 46 and hip area 48 of the door panel 38. The location of the resin inlets 32 is positioned in a location that reduces the amount of plastic shrinkage in the shoulder area 46 and hip area 48. This reduced amount of plastic shrinkage facilitates ejecting the door panel 38 from the mold 12.

Figure 6:
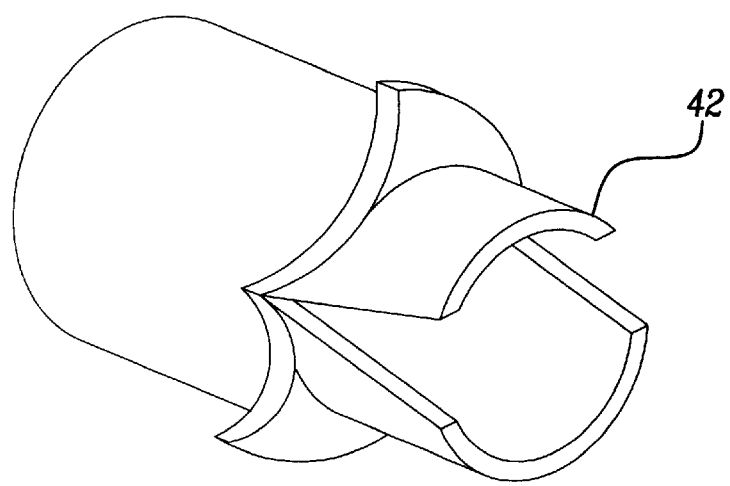
FIG. 6, is a detailed perspective view of the of an energy absorbing column prior to and after collapsing.

FIG. 6 is a detailed perspective view of an energy absorber 42. The energy absorber is formed into a column-shaped having a V-shaped notch 50. The notch 50 causes the energy absorber 42 to peel open and absorb energy in a continuous, uniform manner.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed:

1. A method of manufacturing an automotive interior door panel having a decorative covering displayed to the interior compartment of a vehicle and a rigid substrate having a backing surface, the backing surface having a plurality of energy absorbers integrally molded onto said backing surface, said method comprising the following steps:

providing a low pressure injection mold operable between open and closed positions, said mold having a covering receiving surface and an energy absorber producing surface, said energy absorber producing surface producing said energy absorbers;

positioning a covering juxtaposed said covering receiving surface while said mold is in the open position;

closing said mold and creating a space between said covering and said energy absorber producing surface, said space forming said substrate, said substrate having a nominal cross-sectional thickness between said energy absorbers, said energy absorber producing surface having a plurality of recesses having a width 75% or more of the nominal thickness;

injecting a molten plastic material between said covering and said energy absorber producing surface, said molten plastic material filing said space and said recesses; and allowing said molten plastic material to cool and shrink, whereby said substrate produces sink marks at the intersection of said substrate and said energy absorbers that are concealed beneath said covering.

2. The method of claim 1, wherein said covering is made from polymers and has a thickness between 1.0 mm and 3.5 mm.

3. The method of claim 1, further comprising providing a foam backing on said covering.

4. The method of claim 3, wherein said foam backing expands to fill the sink mark in said substrate cause by said shrinkage.

5. The method of claim 3, wherein said plastic material, foam and covering are made from compatible materials that fuse together and bond during said injecting step.

6. The method of claim 5, wherein said plastic material, foam and covering are made from the same material.

7. The method of claim 1, wherein said energy absorbers include a column having a hollow interior portion.

8. The method of claim 7, wherein said column has a V-shaped notch whereby a force contacting said column causes said column to peel.

* * * * *